United States Patent
Tschanz et al.

(10) Patent No.: US 9,944,115 B2
(45) Date of Patent: Apr. 17, 2018

(54) RIM FOR A MOUNTAIN BIKE

(71) Applicant: DT SWISS INC., Grand Junction, CO (US)

(72) Inventors: Andreas Tschanz, Biel (CH); Martin Walthert, Aarberg (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 15/066,438

(22) Filed: Mar. 10, 2016

(65) Prior Publication Data

US 2016/0263935 A1 Sep. 15, 2016

(30) Foreign Application Priority Data

Mar. 10, 2015 (DE) .................. 10 2015 103 508

(51) Int. Cl.
  *B60B 1/00* (2006.01)
  *B60B 21/10* (2006.01)
  (Continued)

(52) U.S. Cl.
  CPC .............. *B60B 1/006* (2013.01); *B60B 1/003* (2013.01); *B60B 1/041* (2013.01); *B60B 1/044* (2013.01);
  (Continued)

(58) Field of Classification Search
  CPC ....... B60B 1/006; B60B 21/04; B60B 21/025; B60B 1/044; B60B 21/062; B60B 1/041;
  (Continued)

(56) References Cited

U.S. PATENT DOCUMENTS 6,155,651 A * 12/2000 Mizata ................... B60B 1/041
  152/381.6
6,752,187 B1 6/2004 Tien
  (Continued)

FOREIGN PATENT DOCUMENTS

DE          4444044 A1   6/1996
DE    102004047264 A1   4/2006
  (Continued)

OTHER PUBLICATIONS

German Search Report from German Patent Application No. 10 2015 103 508.1, dated Oct. 28, 2015.
  (Continued)

*Primary Examiner* — S. Joseph Morano
*Assistant Examiner* — Jean W Charleston
(74) *Attorney, Agent, or Firm* — Greer, Burns & Crain, Ltd.

(57) ABSTRACT

A rim for a mountain bike is provided, including a rim body having a rim well, a rim base and two lateral rim flanks and a hollow space device with a hollow space. A width of the rim body is larger than 30 mm. The hollow space device of the rim body is radially outwardly limited by the rim well and laterally and radially inwardly, by an inner enclosing wall including the rim base and the rim flanks. The radially inwardly enclosing wall forms an internal wall that is substantially closed, apart from the nipple accommodations. The rim well includes a plurality of recesses having a surface proportion of at least 10% of a surface of the rim well.

17 Claims, 3 Drawing Sheets

(51) Int. Cl.
  *B60B 1/04*  (2006.01)
  *B60B 21/02*  (2006.01)
  *B60B 21/04*  (2006.01)
  *B60B 21/06*  (2006.01)

(52) U.S. Cl.
  CPC .......... *B60B 21/025* (2013.01); *B60B 21/04* (2013.01); *B60B 21/062* (2013.01); *B60B 21/10* (2013.01); *B60B 21/102* (2013.01); *B60B 21/108* (2013.01); *B60B 21/02* (2013.01); *B60B 21/026* (2013.01); *B60B 2900/111* (2013.01)

(58) Field of Classification Search
  CPC ....... B60B 1/003; B60B 21/10; B60B 21/108; B60B 21/102; B60B 2900/111; B60B 21/026; B60B 21/02
  USPC ............ 301/95.102, 95.104, 95.105, 95.106, 301/95.107, 104, 110.5
  See application file for complete search history.

(56) References Cited

U.S. PATENT DOCUMENTS

| | | | | |
|---|---|---|---|---|
| 6,938,962 B1 * | 9/2005 | Schlanger | ............... | B60B 1/041 301/58 |
| 8,113,593 B2 * | 2/2012 | Spahr | .................... | B60B 1/0215 301/58 |
| 8,613,485 B2 * | 12/2013 | Koziatek | ............... | B60B 21/025 152/382 |
| 9,162,524 B2 * | 10/2015 | Koziatek | ............... | B60B 21/025 |
| 2004/0262982 A1 * | 12/2004 | Varrone | ................. | B60B 1/041 301/58 |
| 2006/0273654 A1 | 12/2006 | Lien | | |
| 2014/0346849 A1 | 11/2014 | Shiotani et al. | | |

FOREIGN PATENT DOCUMENTS

| | | |
|---|---|---|
| DE | 202008001617 U1 | 5/2008 |
| DE | 102007052674 A1 | 7/2008 |
| DE | 102009012999 A1 | 9/2010 |
| EP | 0026514 A1 | 4/1981 |
| FR | 2474403 A1 | 7/1981 |
| FR | 2945473 A3 | 11/2010 |
| WO | 2004091937 A1 | 4/2010 |

OTHER PUBLICATIONS

European Search Report from European Patent Application No. 16159178.9, dated Jul. 6, 2017.

* cited by examiner

RIM FOR A MOUNTAIN BIKE

BACKGROUND

The present invention relates to a rim for an at least partially muscle-powered mountain bike and to a wheel having such a rim. Such a rim comprises a rim body with a rim well, a rim base, and two lateral rim flanks, and comprises a hollow space that is enclosed by the rim base, the rim well, and the two lateral rim flanks.

These double wall rims with a hollow space provided between the rim base and the rim well, are known in the prior art. These rims enable high stability and reliability, for example for use with racing bicycles and also with mountain bikes.

Racing bicycles tend to have a comparatively narrow rim width between the rim flanges so as to obtain by way of narrow tires a low rolling resistance and a low aerodynamic drag. For mountain bikes, broader tires and thus wider rims are used. The tires of mountain bikes show a distinct tread to ensure the required ground adhesion for example in accelerating.

Tires and thus also rims showing larger widths are increasingly employed for mountain bikes. While racing bicycles tend to have rim widths of less than 20 mm, mountain bike rims tend to be 30 mm and even 40 mm and more in width.

As the rim width increases, the total weight increases considerably. Recently therefore, mountain bike rims having a large rim width tend to be manufactured in single wall design so as to save a considerable proportion of weight.

Moreover, it has been disclosed to punch out large areas in these rims for mountain bikes so that only a framework-type supporting structure for the tire is left of the single-wall rim. Since as a rule the operating pressure in mountain bikes is comparatively low, loads on the framework are also comparatively low.

It is a disadvantage of these rims that so-called tubeless tires cannot be reliably used without further precautions since the spoke nipples attached to the single-layer rim wall may interact with the tubeless tire in operation which may cause defects.

It is therefore the object of the present invention to provide a stable, lightweight rim for a mountain bike which in particular allows tubeless operation.

SUMMARY

A rim according to the invention is provided for an at least partially muscle-powered mountain bike. The rim according to the invention comprises a rim body with a rim well, a rim base and two lateral rim flanks. Furthermore, a hollow space device with a hollow space is provided. The hollow space device of the rim body is radially outwardly substantially enclosed by the rim well (especially as an outer enclosing wall). The hollow space device is laterally, radially inwardly limited by an inner enclosing wall comprising the rim base and/or the rim flanks. The radially inwardly enclosing wall forms an internal wall that is substantially closed, apart from the nipple accommodations. Preferably a width of the rim body is larger than 30 mm. The rim well shows a plurality of recesses constituting a portion of at least 10% of a surface of the rim well.

The rim according to the invention has many advantages since its double wall or double-wall structure provides high stability. At the same time the high surface proportion of recesses in the rim well allows a low total weight. The double-wall structure allows to dispose a spoke nipple at the rim base so that slight and permanent, periodic movements of the spoke nipples in operation do not affect the tire positioned on the rim well.

A recess in the sense of the present invention may for example be configured as a cutout. It is also possible to already provide the recess in the section used for manufacturing the rim. The recess may be bored, etched, or milled out. Chip-producing or chemical manufacture is possible. Recesses may be manufactured by employing laser or water jets or the like. A recess may pass through, forming a perforation, or only part of the wall may be removed so as to leave another part of the wall. Particularly preferably recesses are configured (at least partially) as perforations or through holes.

In all the cases the hollow space device comprises a hollow space. It is also possible for the hollow space device to comprise two or more different hollow spaces that may be partially or completely separate from one another. Particularly preferably the hollow space device comprises exactly one hollow space.

The hollow space is preferably limited by the rim base and the rim well and the two rim flanks connecting the rim base with the rim well. The rim flanks also laterally limit the hollow space at least in sections. Particularly preferably, recesses are disposed in the (axial) center region of the rim well, periodically alternating with support stems in the peripheral direction.

In all the configurations it is particularly preferred for the rim to consist at least substantially nearly entirely, or entirely, of a metal and in particular a light metal or a light metal alloy. Other configurations may also provide for the rim to at least partially or entirely consist of a fibrous composite material.

Preferably a plurality of nipple accommodations is disposed or configured to accommodate spoke nipples in the radially inwardly enclosing wall distributed over the circumference. The nipple accommodations are provided for the attachment of at least one spoke nipple each which serves to fasten a spoke. The nipple accommodations are in particular provided at the rim base. Or else it is possible to provide a number of nipple accommodations or part of the nipple accommodations on one and/or the other of the rim flanks. Particularly preferably the rim well is at any rate not provided with nipple accommodations.

In preferred specific embodiments the rim well is provided with nipple passages aligned with the nipple accommodations for inserting spoke nipples from the outside into the nipple accommodations. Particularly preferably each nipple passage is provided for at least one spoke nipple to pass through. Each nipple accommodation may be configured to accommodate one or else two or more spoke nipples.

Advantageously the radially inwardly enclosing wall forms an internal wall that is substantially closed, apart from the nipple accommodations. This configuration is particularly advantageous since the rim or a wheel equipped therewith maintains its operational properties reliably and permanently even in rides through off-road terrain. For example, when the radially inwardly enclosing wall is provided with perforations, dirt may be deposited in the rim interior during rides so that the riding characteristics would change in operation.

With the rim according to the invention these changes are reliably prevented since the inner enclosing wall forms an internal wall that is closed, apart from the nipple accommodations and optionally a valve passage. In operation the spoke nipples are disposed at the nipple accommodations and a valve is disposed at the valve passage so that the interior of the rim or the hollow space of the hollow space device is configured closed toward the ambience.

In particularly preferred configurations, rim flanges are provided wherein the rim flanges in particular protrude radially outwardly from the rim well or radially outwardly beyond the rim well.

Preferably the rim flanks make an in particular seamless and/or continuous, radially outwardly transition to the rim flanges.

In preferred specific embodiments the rim well comprises, laterally adjacent to the rim flanks and in particular adjoining the rim flanks, a support section each for a tire and a center region between the support sections. The support sections extend axially inwardly, transverse to the rim flanks and preferably about perpendicular to the rim flanks. The center region preferably forms a circumferential groove or forms a circumferential depression or comprises a circumferential groove.

In all the configurations the support sections are preferably configured as continuously circumferential stems so as to preferably support the tire over its entire circumference. These stems can also be called flanges.

All the configurations may provide non-round and/or polygonal and in particular triangular, quadrangular, pentagonal, hexagonal, and in particular approximately rectangular recesses or else round or rounded recesses. (Polygonal) recesses having rounded corners are particularly preferred. A corner radius ensues in particular from the radius of a milling tool used for manufacturing the recess.

The recesses may be configured partially or on the whole as through holes. If through holes are used for the recesses, then at least part of the rim well is formed by cutouts with support stems disposed in between. It is possible to form the rim well entirely and preferably in the center region of the rim well by recesses with support stems disposed in between which support stems may be arranged framework-like. Particularly preferably, recesses are disposed in the (axial) center region of the rim well, periodically alternating with support stems in the peripheral direction.

The recesses do not form a continuous groove in the peripheral direction such as a groove for receiving the tire beads in mounting but they are additional measures for weight reduction.

Configurations with recesses whose width in the peripheral direction is broader than are the support stems allows a particularly high weight reduction. This applies both to recesses formed as through holes and to recesses where only a part of the wall of the rim well is removed.

In preferred specific embodiments of the invention at least one recess has a wall thickness of the rim well that is at least 20% less than that of a support stem of the rim well, in particular adjacent to a recess. It is also possible to provide a wall thickness of the rim well that is 30% or 40% or 50% or 60% or 70% less than a wall thickness of a support stem of the rim well and/or the circumferential stem of the rim well.

It is particularly preferred to provide the wall thicknesses for the rim well in the region of the support stems and the wall thicknesses of the circumferential stems to be identical or substantially identical. Deviations of ±10% or ±20% are possible. The support stems may in particular be configured thicker in the radial direction than the circumferential stems so as to relatively increase the rigidity in the center region in the radial direction.

In preferred specific embodiments a width of the rim body is preferably more than 1.5 times the radial extension from the inner surface of the rim base to a radially outermost point of the rim body. A width of the rim body is in particular more than twice the radial extension from the inner surface of the rim base to the radially outermost point of the rim body or the rim flange. These dimensions define a particularly wide rim. The width of the rim body is preferably more than or equal to 30 mm. The rim is particularly preferably broader than 40 mm.

A rim width of the rim body is preferably larger than 30 mm and it may preferably be larger than 40 mm. In a preferred configuration a total width of the rim is more than 55 mm while a height of the rim from the inner surface of the rim base to the outermost tip of the rim flange is less than 24 mm. The hollow space in the interior of the rim body extends over a maximum width of more than 50 mm.

A wheel according to the invention is equipped with a rim as it was described above. The wheel further comprises a hub that is connected to the rim through a plurality of spokes. The spokes are fastened by means of spoke nipples disposed in the hollow space of the rim. The wheel is preferably equipped with a tire whose operating pressure does not rise above 2 bars excess pressure and in particular 1.5 bar and preferably 1.2 bars excess pressure. The wheel is particularly preferably provided for a mountain bike, comprising an axial width of more than 30 mm, in particular more than 40 mm and optionally more than 50 mm.

On the whole the invention provides a rim and a wheel having such a rim. Although the rim has a low weight it shows high stress tolerance. Tubeless tires can be used since the spoke nipples are reliably accommodated in the hollow space region or in the hollow space of the rim body. The fact that the air pressures used in mountain bikes are low results in weak loads on the rim well. Tension peaks and optionally possible cracks due to notch stresses basically rather occur with the spoke holes so that large area recesses or cutouts in the region of the rim well are possible without jeopardizing stability. The rim can also be used for other suited wheels and bicycles.

In all the configurations a ratio of a total surface of the recesses on the periphery to a peripheral surface of the center region between the laterally peripheral stems may exceed beyond 1/4 and in particular 1/3 and preferably 1/2 and particularly preferably 1/1. A ratio of a total surface of the recesses on the periphery to a peripheral surface of the center region between the laterally peripheral stems may be higher than 2:1 and may reach and exceed 3:1. This means that the center region is provided with recesses along a peripheral line over more than 1/3 of its length. At least 1/20 and preferably at least 1/10 of the length of a peripheral line is formed of support stems between recesses.

In all the specific embodiments the surface proportion of the recesses of a total peripheral surface of the rim well may reach and exceed 1/4 and in particular 1/3 and preferably 1/2 and particularly preferably 1:1.

It is possible to leave separate nipple passages at the rim well. Or else it is possible to form nipple passages as part of cutouts for example when removing the rim well in the region of the cutouts.

When using a framework-like structure in the region of the rim well, then tension members are practically used for support stems to optimally take up the pressure loads of the tire. The large recesses allow easy and optimal accessibility of the spoke nipples. Large recesses furthermore allow to increase the wall thickness in the transverse cross-members of the rim well without particularly affecting the total weight.

For the use of tubeless tires, the recesses may be covered e.g. with an elastic cover tape and in particular a standard cover tape since these cover tapes withstand the low pressures even in the case of comparatively large-area recesses. This applies all the more for cutouts configured as recesses so that part of the wall is left. Such a cover tape may be a component of the rim and/or of a wheel.

The transitions from the recesses configured as through holes to the support stems and/or the transitions from recesses having reduced wall thicknesses to support stems may be provided with any desired sharp edges or else with any desired smooth transition. It is possible to provide transitions with a step or a number of steps. Or else it is possible to provide a gradual and/or continuous transition between a recess and a support stem.

In all the configurations it is preferred for a substantially continuous, stepless wall to be configured on the radially inside surface if non-continuous recesses are provided. In these configurations, recesses are preferably configured radially outwardly open.

BRIEF DESCRIPTION OF THE DRAWINGS

Further advantages and features of the present invention can be taken from the exemplary embodiments which will be described below with reference to the enclosed figures.

The figures show in.

DETAILED DESCRIPTION

Figure 1:
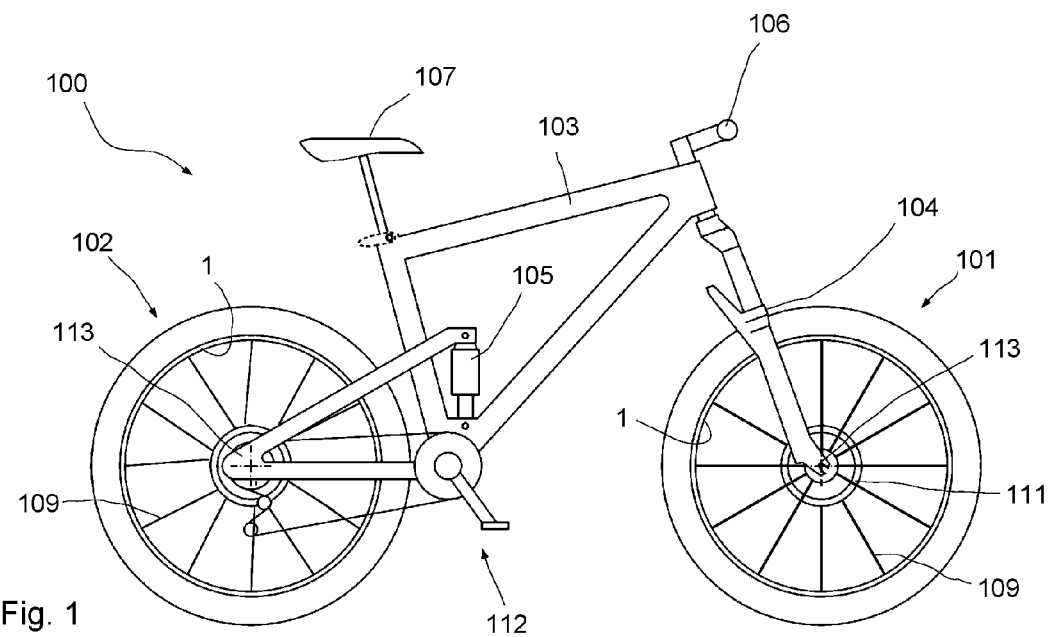
FIG. 1 a schematic side view of a mountain bike.

FIG. 1 shows a schematic illustration of a mountain bike as the bicycle or two-wheeled vehicle 100. The mountain bike 100 comprises two wheels 101, 102, a front wheel 101 and a rear wheel 102. Furthermore, a frame 103, a suspension fork 104, a rear wheel damper 105, a handlebar 106, and a saddle 107 are provided. The drive 112 is provided by means of pedals and in this case, a chain shifting device respectively derailleur. The front wheel 101 and the rear wheel 102 are each fastened to dropouts 113 on the fork 104 or the frame 103.

Figures 2, 3:
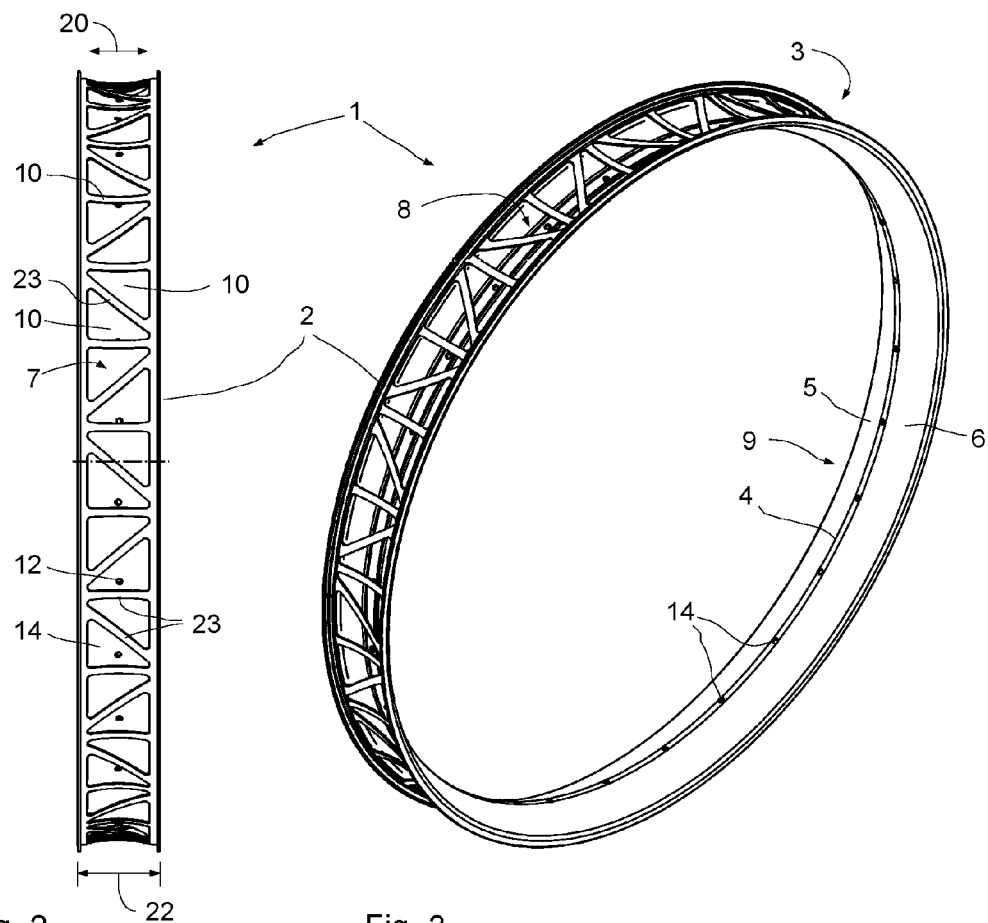
FIG. 2 a schematic front view of a rim according to the invention.
FIG. 3 the rim according to FIG. 2 in a perspective view.
Figure 4:
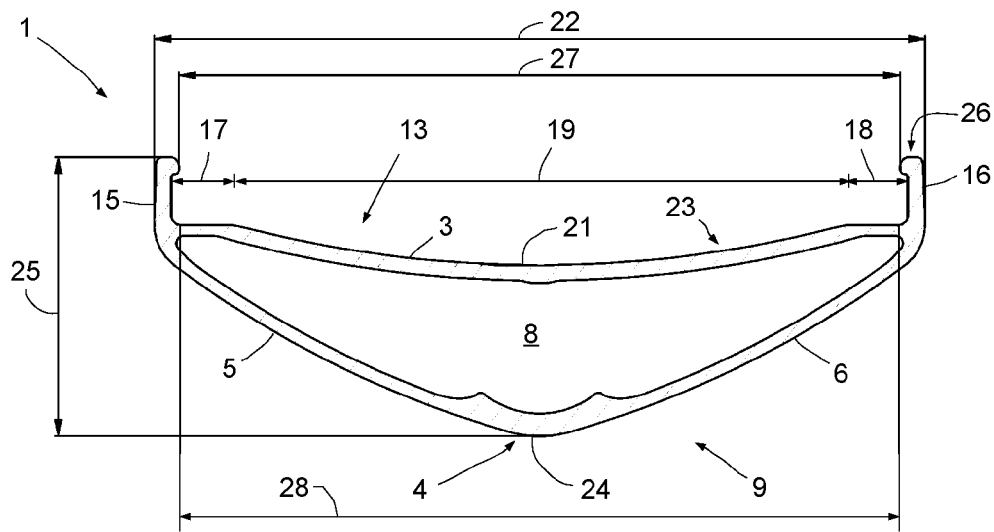
FIG. 4 a cross-section of the rim according to FIG. 2.

FIG. 2 shows a schematic front view of a rim 1 according to the invention. FIG. 3 shows a perspective view of the rim 1 from FIG. 2 and FIG. 4 represents a pertaining cross-section of the rim 1.

The rim 1 comprises a rim body 2 provided with a hollow space device 7 presently having exactly one hollow space 8. The hollow space 8 is limited radially inwardly and sidewardly by a presently integral, inner enclosing wall 9 consisting of the rim base 4 and the rim flanks 5 and 6.

The hollow space 8 is limited radially outwardly by the rim well 3 in which large-area recesses 10 are provided. The recesses 10 are configured approximately triangular, showing rounded corners. Between recesses 10 support stems 23 are provided forming the supporting portion of the rim well 3.

In the rim base 4, nipple accommodations 12 are configured which serve to receive as a rule conventional spoke nipples, not illustrated. The spoke nipples are mounted by inserting them from the outside through the cutouts 10 into the nipple accommodations 12. Then the nipple body protrudes radially inwardly through the rim base 4, and the nipple head of the spoke nipple is retained in the nipple accommodation in the interior of the hollow space 8. It is possible for the nipple head and/or the nipple accommodation to be configured hemispherical to enable angular alignment of a spoke nipple in the nipple accommodation 12. It is also possible to have a convex outer surface of the spoke nipple head contacting a convex surface of the nipple accommodation to ensure low-friction alignment of the spoke nipple head.

The total width 22 of the rim body 2 in the lateral direction 20 is noticeably larger than a radial thickness 25 of the rim body 2 between the rim base 4 and the radially outermost point of the rim flanks 5, 6 or the rim flanges 15, 16.

FIG. 4 shows a cross-section of the rim 1 according to FIGS. 2 and 3. The hollow space 8 is located between the inner peripheral wall 9 and the outer peripheral wall which is formed by the rim well 3. The inner peripheral wall 9 is formed by the rim base 4 and the rim flanks 5 and 6 following on both sides. The inner peripheral wall 9 is a closed wall that is interrupted only for the nipple accommodations. The rim flanks 5 and 6 make seamless transitions to a rim flange 15 respectively 16.

A total width 22 of the rim 1 is more than twice a radial extension 25 between the inner peripheral surface 24 of the rim base 4 and the radially outermost point 26 at the rim flanges 15 respectively 16. The rim width 27 is somewhat less and corresponds to approximately the width of the hollow space 8.

The rim well 3 comprises in the lateral direction 20 three sections namely, adjacent to the rim flange 15, a support section 17 and adjacent to the rim flange 16, a support section 18. A center region 19 extends between the support sections 17 and 18.

While the support sections 17 and 18 are aligned transverse to the rim flanges 15 and 16 and presently substantially perpendicular to the rim flanges 15 and 16, the center region 19 forms a circumferential groove or a depression along the circumference. The support stems 23 and the recesses 10 in this exemplary embodiment are only located in the center region 19. The support sections 17 and 18 are configured as circumferential stems for supporting a tire. There are no recesses in these sections. Or else it is possible to provide recesses at least up to the possible width 28. Preferably at least minimal circumferential stems 17 and 18 are left immediately next to the rim flanges 15 and 16 to ensure a circumferential tire support. An axial width of the circumferential stems is preferably between the actual wall thickness of the rim flanges and ten times the wall thickness of the rim flanges and in particular between 2 mm and 10 mm.

Figures 5A, 5B, 5C:
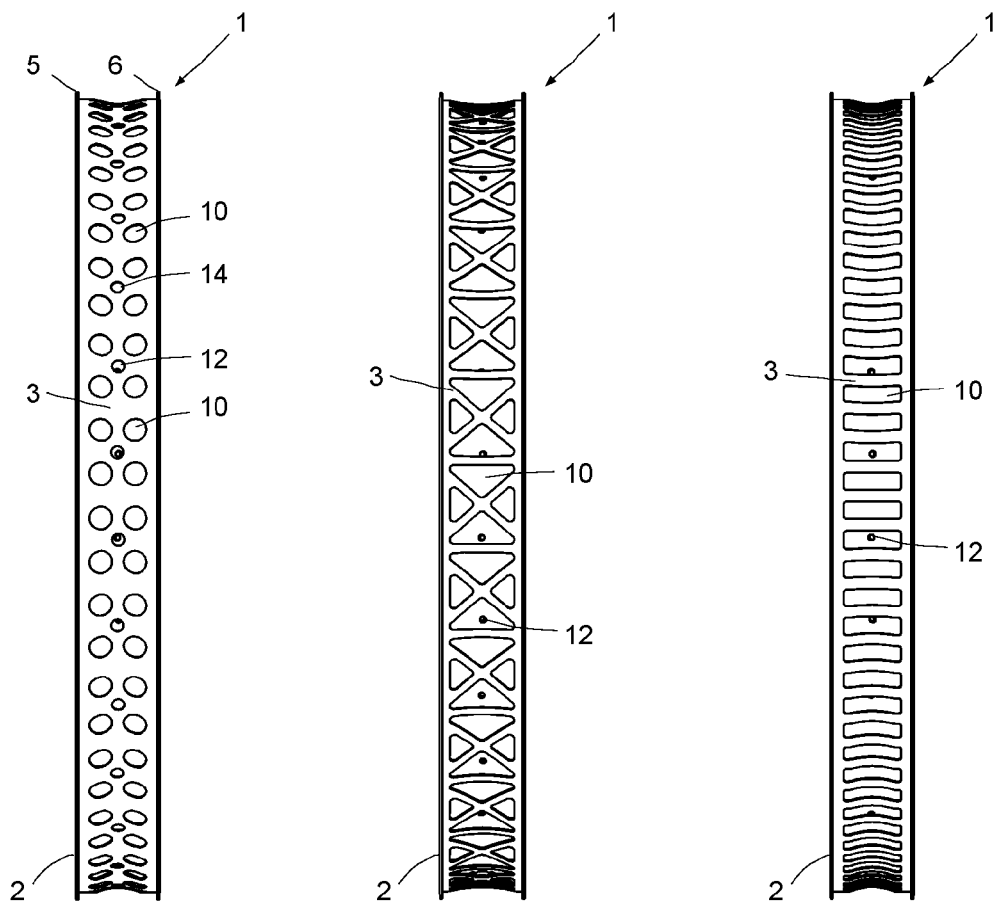
FIG. 5a-c various configurations of a rim according to the invention.

FIG. 5a shows a rim 1 with circular recesses 10 that are for example bored into the rim well 3. Separate nipple passages 14 are provided which are suitable for passing through spoke nipples to dispose the spoke nipples in the nipple accommodations 12 in the rim base 4 during mounting.

FIG. 5b illustrates a variant where crossing support stems 23 are provided in the rim well 3 of the rim 1, respectively substantially triangular recesses 10 are provided so as to leave cross-type support stems 23.

FIG. 5c shows a variant with recesses 10 disposed evenly distributed over the circumference of the rim 1 and which at the same time also serve to pass spoke nipples through for placing the spoke nipples in the pertaining nipple accommodation 12.

Both in the exemplary embodiment of the rim 1 according to FIGS. 2-4 and in the exemplary embodiment illustrated in FIG. 5 a surface proportion of the recesses 10 of the total surface 13 (see FIG. 4) of the rim well 3 is more than 10%. Preferably the surface proportion is >20% and preferably it reaches 30% or 40%. The proportion may in particular with framework-like structures reach 50%, 60%, 70% and much more.

In the exemplary embodiment according to FIG. 5c the surface proportion is determined by the total sum of the surfaces of the recesses 10 relative to the total surface of the rim well 3, which results approximately from the lateral inner distance of the rim flanges 15 and 16 multiplied by the circumference of the rim well 3. The surface proportion of the recesses 10 to the entire peripheral surface is the same as in the exemplary embodiment according to FIG. 5b or FIG. 2, more than 40% and in particular more than 50%. In the peripheral direction the length proportion of the support stems in the center region 19 is preferably more than 3% and in particular more than 5%, and it may be more than 10%. The proportion is preferably less than 70% and in particular less than 50%.

With reference to the FIGS. 6-8 another exemplary embodiment of a rim 1 according to the invention will now be explained, wherein recesses 11 are provided where the wall thickness of the rim well 3 is only reduced while no through holes are present.

Again, the rim body 2 comprises a hollow space 8 of a hollow space device 7. The hollow space 8 is limited radially inwardly by an inner enclosing wall 9 that is formed of the rim flanks 5 and 6 and the rim base 4. The hollow space 8 is limited outwardly by the rim well 3 which in the lateral direction 20 is composed of the lateral support sections 17 and 18 adjacent to the rim flanges 15 and 16 and a center region 19. As in the other exemplary embodiments, a proportion of the width of the center region 19 is more than 60% of the rim width.

In the support sections 17 and 18, circumferential stems are configured having a circumferentially constant wall thickness. In the center region 19 the rim well has recesses 11 and evenly spaced nipple passages 14. The cross-section dimensions of the recesses 11 and the nipple passages 14 may be the same or different. At any rate the nipple passages 14 are provided with through holes while only part of the rim wall is removed for the illustrated recesses 11, thus reducing weight.

It is also possible to provide both recesses 10 and recesses 11 wherein the recesses 10 are provided as through holes and the recesses 11, as cutouts in the rim well wherein part of the wall of the rim well 3 is left in the recesses 11 only.

Figure 7:
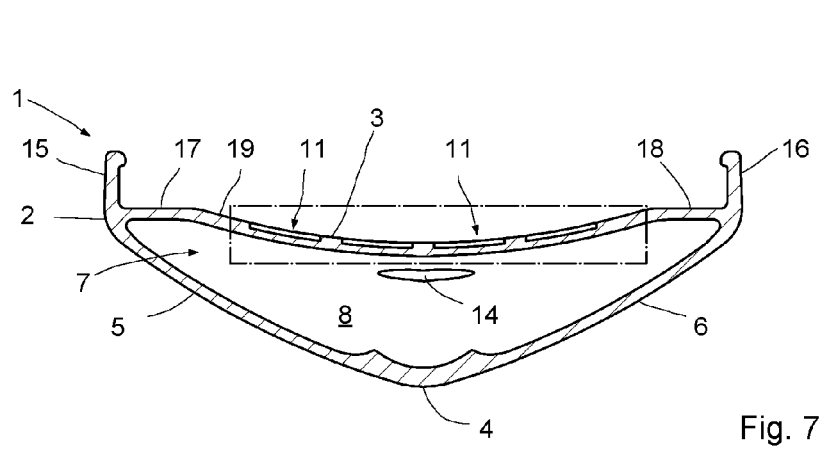
FIG. 7 the rim according to FIG. 6 in section.
Figure 8:
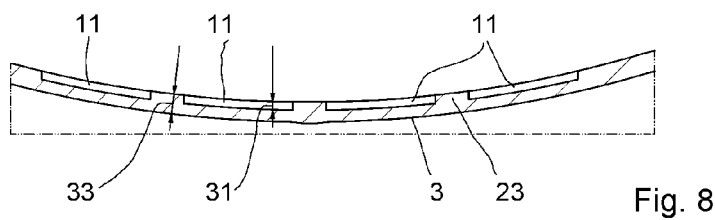
FIG. 8 an enlarged detail from FIG. 7.

As illustrated in FIG. 8 which shows an enlargement of the dash-dotted detail from FIG. 7, the regular stem thickness 33 of a support stem 23 or the rim well 3 is reduced by the depth 31 of the recess 11. In this exemplary embodiment the stem thickness 33 may for example be 1.2 mm while the depth of the recesses 11 is approximately 0.5 mm. Or else it is possible to increase the depth 11 and thus to locally further decrease the rim well thickness.

Figure 9:
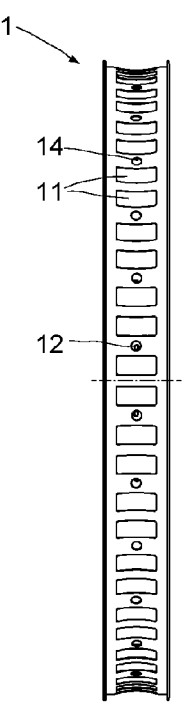
FIG. 9 another exemplary embodiment of a front view of a rim according to the invention.
Figure 10:
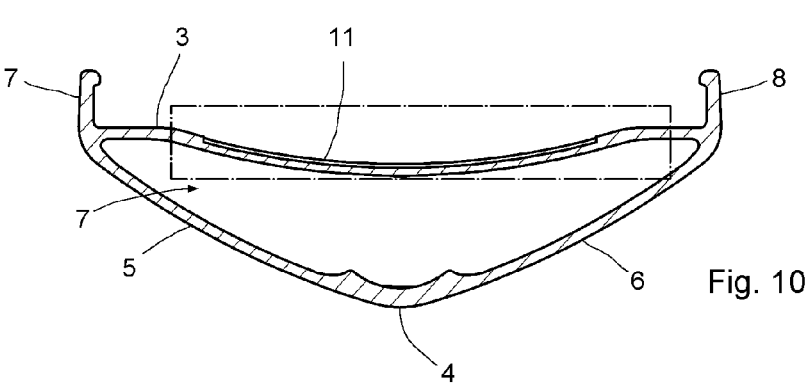
FIG. 10 the rim according to FIG. 9 in section.
Figure 11:
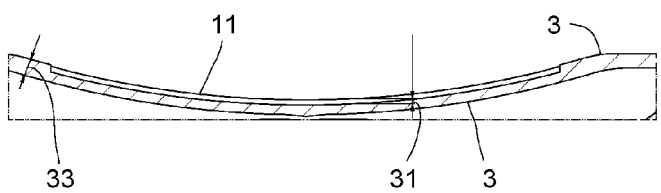
FIG. 11 an enlarged detail from FIG. 10.

The FIGS. 9-11 show another exemplary embodiment of a rim 1 according to the invention, FIG. 9 showing a front view, FIG. 10, a cross-section of the rim 1, and FIG. 11, the enlarged dash-dotted detail from FIG. 10.

Figure 6:
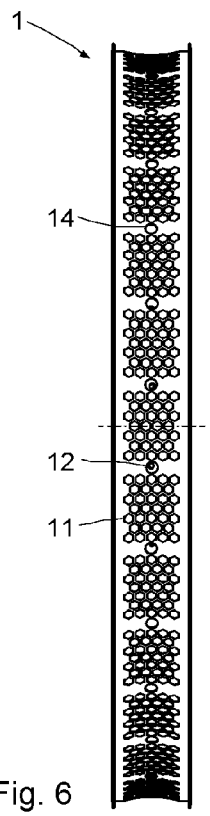
FIG. 6 another exemplary embodiment of a front view of a rim according to the invention.

Unlike the exemplary embodiment according to FIGS. 6-8 the exemplary embodiment according to FIGS. 9-11 is substantially provided with rectangular recesses 11 where a stem thickness 33 or thickness of the rim well 3 is considerably reduced. In the exemplary embodiment according to FIGS. 9-11 only part of the wall thickness is removed in the recesses 11 so that the rim well 3 forms a continuous wall that is perforated only by the nipple passages 14 and optionally a valve passage. The recess corners may be rounded for example for reasons of manufacturing.

Or else it is again possible to combine recesses 10 according to the FIGS. 2-5 with recesses 11 according to FIG. 9 to 11 or according to FIGS. 6-8, so as to obtain for one, recesses 10 as through holes and for another, recesses 11 having reduced wall thicknesses.

In the exemplary embodiment according to FIGS. 9-11 the wall thickness is reduced by the depth 31 in the region of the recesses 11 so that instead of a wall thickness of 1.2 mm, a wall thickness of only 0.7 mm remains. A remaining wall thickness of 0.4 mm or 0.5 mm or 0.6 mm or the like is also possible.

In the exemplary embodiment according to the FIGS. 9-11 the recesses 11 extend over a substantial part of the center region 19. Again, the support sections 17 and 18 are configured as continuous, circumferential stems of even wall thicknesses.

In all the exemplary embodiments various combinations of recesses may be provided. It is in particular also possible to have a stepped or continuous transition of recesses 10 or 11 to support stems 23 or to the lateral support sections 17 and 18. It is possible for the wall thickness to change in steps on one side while on the other side the wall thickness changes continuously, extending over 1 mm length, 5 mm length, or 10 mm length or more.

The invention enables noticeable reduction of the weight of a rim 1 over conventional rims while at the same time achieving increased stability. A rim 1 according to the invention is suitable for use with tubeless tires and ensures high quality.

While a particular embodiment of the present rim for a mountain bike has been described herein, it will be appreciated by those skilled in the art that changes and modifications may be made thereto without departing from the invention in its broader aspects and as set forth in the following claims.

LIST OF REFERENCE NUMERALS 1 rim
2 rim body
3 rim well
4 rim base
5 rim flank
6 rim flank
7 hollow space device
8 hollow space
9 enclosing wall
10 recess
11 recess
12 nipple accommodation
13 surface
14 nipple grommet
15 rim flange
16 rim flange
17 support section 18 support section
19 center region
20 lateral direction
21 circumferential groove
22 width of 2
23 support stem
24 inner surface of 4
25 radial extension
26 radially outermost point
27 nominal rim width
28 possible width of 10
31 depth of 11
33 thickness of stem
100 mountain bike, bicycle
101 wheel, front wheel
102 wheel, rear wheel
103 frame
104 fork
105 damper
106 handlebar
107 saddle
108 hub
109 spoke
111 brake disk
112 drive
113 dropout

The invention claimed is:

1. A rim for an at least partially muscle-powered bicycle comprising: a rim body having a rim well, a rim base and two lateral rim flanks; and a hollow space device with a hollow space; wherein the hollow space device of the rim body is radially outwardly limited by the rim well and laterally and radially inwardly by an inner enclosing wall comprising at least one of the rim base and the rim flanks, wherein a width of the rim body is larger than 30 mm, the radially inwardly enclosing wall forms an internal wall that is substantially closed, apart from the nipple accommodation, and that the rim well comprises a plurality of recesses having a surface proportion of at least 20% of a surface of the rim well.

2. The rim according to claim 1, wherein a plurality of nipple accommodations for receiving spoke nipples is disposed in the radially inner enclosing wall distributed over the circumference.

3. The rim according to claim 1, wherein the rim well is provided with nipple passages aligned with the nipple accommodations to allow to insert spoke nipples from the outside into the nipple accommodations.

4. The rim according to claim 1, wherein rim flanges are provided.

5. The rim according to claim 1, wherein the rim flanks make a radially outwardly transition to the rim flanges.

6. The rim according to claim 1, wherein the rim well comprises laterally adjacent to the rim flanks, a support section each, for a tire and a center region between the support sections.

7. The rim according to claim 1, wherein the hollow space device extends in the lateral direction until radially beneath the support sections.

8. The rim according to claim 1, wherein the center region forms a circumferential groove.

9. The rim according claim 1, wherein the support sections are configured as continuous, circumferential stems.

10. The rim according claim 1, wherein non-round and/or polygonal recesses are provided.

11. The rim according to claim 1, wherein at least one recess has rounded corners.

12. The rim according to claim 1, wherein at least one recess is configured as a through hole.

13. The rim according to claim 1, wherein at least part of the rim well is formed by recesses with support stems disposed in between.

14. The rim according to claim 1, wherein at least one recess has a wall thickness of the rim well that is at least 20% less than that of a support stem of the rim well.

15. The rim according to claim 1, wherein a width of the rim body is more than twice the size of a radial extension from the inner surface of the rim base to a radially outermost point of the rim body.

16. The rim according to claim 1, wherein a rim width of the rim body is larger than 30 mm.

17. A wheel comprising a rim according to claim 1, and a hub that is connected with the rim through a plurality of spokes wherein the spokes are attached by means of spoke nipples disposed in the hollow space of the rim.

* * * * *